United States Patent
Davis et al.

(10) Patent No.: US 9,479,521 B2
(45) Date of Patent: Oct. 25, 2016

(54) SOFTWARE NETWORK BEHAVIOR ANALYSIS AND IDENTIFICATION SYSTEM

(71) Applicant: The Boeing Company, Chicago, IL (US)

(72) Inventors: Aaron R. Davis, Bellevue, WA (US); Timothy M. Aldrich, Federal Way, WA (US); Matthew S. Bialek, Annapolis Junction, MD (US); Timothy M. Lemm, Annapolis Junction, MD (US); Shaun Kospiah, San Jose, CA (US)

(73) Assignee: The Boeing Company, Chicago, IL (US)

( * ) Notice: Subject to any disclaimer, the term of this patent is extended or adjusted under 35 U.S.C. 154(b) by 152 days.

(21) Appl. No.: 14/042,153

(22) Filed: Sep. 30, 2013

(65) Prior Publication Data
US 2015/0096019 A1    Apr. 2, 2015

(51) Int. Cl.
*H04L 29/06* (2006.01)

(52) U.S. Cl.
CPC ......... *H04L 63/1408* (2013.01); *H04L 63/145* (2013.01)

(58) Field of Classification Search
CPC ............. H04L 63/1408; H04L 63/145; H04L 29/06911; H04L 29/06925; H04L 29/06931; H04L 29/06938; G06F 21/55
USPC .......................................................... 726/23
See application file for complete search history.

(56) References Cited

U.S. PATENT DOCUMENTS

| | | |
|---|---|---|
| 6,487,666 B1 | 11/2002 | Shanklin et al. |
| 6,839,850 B1 | 1/2005 | Campbell et al. |
| 6,981,279 B1 | 12/2005 | Arnold et al. |
| 7,084,760 B2 | 8/2006 | Himberger et al. |
| 7,096,498 B2 | 8/2006 | Judge |
| 7,131,036 B2 | 10/2006 | Wray et al. |
| 7,143,113 B2 | 11/2006 | Radatti |
| 7,201,662 B2 | 4/2007 | LeMay et al. |
| 7,213,260 B2 | 5/2007 | Judge |
| 7,299,358 B2 | 11/2007 | Chateau et al. |

(Continued)

FOREIGN PATENT DOCUMENTS

| | | |
|---|---|---|
| EP | 1708114 A2 | 10/2006 |
| WO | 2004021637 A1 | 3/2004 |

(Continued)

OTHER PUBLICATIONS

U.S. Appl. No. 13/941,325, filed Jul. 12, 2013, 49 pages.

(Continued)

*Primary Examiner* — William Goodchild
(74) *Attorney, Agent, or Firm* — Toler Law Group, PC

(57) ABSTRACT

A particular method includes detecting, at a detection module, an indicator corresponding to a suspicious software component, where the indicator is detected based on monitored network data of a network system and based on a plurality of network behavior profiles. At least one of the network behavior profiles includes an ordered sequence of network actions. The method further includes determining, at an identification module, whether the indicator corresponds to any of the plurality of network behavior profiles. The method further includes generating output data in response to a determination that the indicator corresponds to a particular network behavior profile of the plurality of network behavior profiles.

20 Claims, 6 Drawing Sheets

(56) References Cited

U.S. PATENT DOCUMENTS

| | | | |
|---|---|---|---|
| 7,360,249 | B1 | 4/2008 | Szor et al. |
| 7,386,532 | B2 | 6/2008 | Kiessig et al. |
| 7,398,553 | B1 | 7/2008 | Li |
| 7,434,261 | B2 | 10/2008 | Costea et al. |
| 7,451,325 | B2 | 11/2008 | Aaron |
| 7,540,030 | B1 | 5/2009 | Zaitsev |
| 7,631,356 | B2 | 12/2009 | Hatlelid et al. |
| 7,657,935 | B2 | 2/2010 | Stolfo et al. |
| 7,730,325 | B2 | 6/2010 | Morrow et al. |
| 7,779,472 | B1 | 8/2010 | Lou |
| 8,161,130 | B2 | 4/2012 | Stokes et al. |
| 8,191,146 | B2 | 5/2012 | Di Crescenzo et al. |
| 8,205,258 | B1 | 6/2012 | Chang et al. |
| 8,256,003 | B2 | 8/2012 | Dadhia et al. |
| 8,370,931 | B1 | 2/2013 | Chien et al. |
| 8,381,298 | B2 | 2/2013 | Blumfield et al. |
| 8,402,541 | B2 | 3/2013 | Craioveanu et al. |
| 8,413,235 | B1 | 4/2013 | Chen et al. |
| 8,413,247 | B2 | 4/2013 | Hudis et al. |
| 8,429,629 | B2 | 4/2013 | Drepper |
| 8,443,441 | B2 | 5/2013 | Stolfo et al. |
| 8,479,296 | B2 | 7/2013 | Mashevsky et al. |
| 8,484,338 | B2 | 7/2013 | Paster |
| 8,528,086 | B1 | 9/2013 | Aziz |
| 8,555,392 | B2 | 10/2013 | Golovkin |
| 8,560,593 | B2 | 10/2013 | Ghostine |
| 8,572,743 | B2 | 10/2013 | Di Crescenzo et al. |
| 8,578,498 | B2 | 11/2013 | Di Crescenzo et al. |
| 8,661,547 | B1 | 2/2014 | Kononov et al. |
| 8,719,925 | B1 | 5/2014 | Berg |
| 8,813,222 | B1 | 8/2014 | Codreanu et al. |
| 2003/0023864 | A1 | 1/2003 | Muttik et al. |
| 2003/0140049 | A1 | 7/2003 | Radatti |
| 2003/0167402 | A1 | 9/2003 | Stolfo et al. |
| 2003/0212902 | A1 | 11/2003 | Van Der Made |
| 2004/0255165 | A1 | 12/2004 | Szor |
| 2004/0260945 | A1 | 12/2004 | Raikar et al. |
| 2005/0018618 | A1 | 1/2005 | Mualem et al. |
| 2005/0262556 | A1 | 11/2005 | Waisman et al. |
| 2006/0136720 | A1 | 6/2006 | Armstrong et al. |
| 2006/0161761 | A1 | 7/2006 | Schwartz et al. |
| 2007/0006028 | A1 | 1/2007 | Desouza et al. |
| 2007/0044160 | A1 | 2/2007 | Ishibashi |
| 2007/0056035 | A1 | 3/2007 | Copley |
| 2007/0079375 | A1 | 4/2007 | Copley |
| 2007/0174915 | A1 | 7/2007 | Gribble et al. |
| 2007/0240217 | A1* | 10/2007 | Tuvell ............... G06F 21/56 726/24 |
| 2007/0240222 | A1 | 10/2007 | Tuvell et al. |
| 2008/0016570 | A1 | 1/2008 | Capalik |
| 2008/0047009 | A1 | 2/2008 | Overcash et al. |
| 2008/0086776 | A1 | 4/2008 | Tuvell et al. |
| 2008/0109871 | A1 | 5/2008 | Jacobs |
| 2008/0127336 | A1 | 5/2008 | Sun et al. |
| 2008/0134337 | A1 | 6/2008 | Crescenzo et al. |
| 2008/0141371 | A1 | 6/2008 | Bradicich et al. |
| 2008/0178294 | A1* | 7/2008 | Hu ............... G06F 21/552 726/24 |
| 2008/0196099 | A1 | 8/2008 | Shastri |
| 2008/0196104 | A1 | 8/2008 | Tuvell et al. |
| 2008/0262991 | A1 | 10/2008 | Kapoor et al. |
| 2008/0263659 | A1 | 10/2008 | Alme |
| 2008/0288493 | A1 | 11/2008 | Yang et al. |
| 2008/0295174 | A1 | 11/2008 | Fahmy et al. |
| 2008/0301810 | A1 | 12/2008 | Lehane et al. |
| 2008/0320594 | A1 | 12/2008 | Jiang |
| 2009/0038015 | A1 | 2/2009 | Diamant et al. |
| 2009/0070878 | A1 | 3/2009 | Wang et al. |
| 2009/0126016 | A1 | 5/2009 | Sobko et al. |
| 2009/0199296 | A1 | 8/2009 | Xie et al. |
| 2010/0031353 | A1 | 2/2010 | Thomas et al. |
| 2010/0058473 | A1* | 3/2010 | Breitenbacher ....... G06F 21/566 726/23 |
| 2010/0115617 | A1 | 5/2010 | Weber et al. |
| 2010/0132038 | A1 | 5/2010 | Zaitsev |
| 2010/0142371 | A1* | 6/2010 | Gooch ............... H04L 43/026 370/229 |
| 2010/0162395 | A1 | 6/2010 | Kennedy |
| 2010/0192222 | A1 | 7/2010 | Chicioreanu et al. |
| 2010/0263049 | A1 | 10/2010 | Cross et al. |
| 2011/0078794 | A1 | 3/2011 | Manni et al. |
| 2011/0185423 | A1 | 7/2011 | Sallam |
| 2012/0017275 | A1 | 1/2012 | Harmonen |
| 2012/0079596 | A1 | 3/2012 | Thomas et al. |
| 2012/0159181 | A1 | 6/2012 | Di Crescenzo et al. |
| 2012/0167223 | A1 | 6/2012 | Di Crescenzo et al. |
| 2012/0174227 | A1 | 7/2012 | Mashevsky et al. |
| 2012/0222120 | A1 | 8/2012 | Rim et al. |
| 2012/0304244 | A1 | 11/2012 | Xie et al. |
| 2012/0317306 | A1 | 12/2012 | Radinsky et al. |
| 2012/0330863 | A1 | 12/2012 | McDougal et al. |
| 2013/0036103 | A1 | 2/2013 | Lawson et al. |
| 2013/0055396 | A1 | 2/2013 | Wang et al. |
| 2013/0111547 | A1 | 5/2013 | Kraemer |
| 2013/0139265 | A1 | 5/2013 | Romanenko et al. |
| 2013/0167236 | A1 | 6/2013 | Sick |
| 2013/0227300 | A1 | 8/2013 | Golovkin |
| 2013/0246378 | A1 | 9/2013 | Hearnden et al. |
| 2014/0130161 | A1 | 5/2014 | Golovanov |
| 2014/0150100 | A1 | 5/2014 | Gupta et al. |
| 2014/0157407 | A1 | 6/2014 | Krishnan et al. |
| 2014/0351810 | A1 | 11/2014 | Pratt et al. |
| 2015/0007325 | A1 | 1/2015 | Eliseev et al. |
| 2015/0019915 | A1 | 1/2015 | Kospiah et al. |

FOREIGN PATENT DOCUMENTS

| | | | |
|---|---|---|---|
| WO | WO 2004-021637 a1 * | 3/2004 | ............... H04L 9/00 |
| WO | 2008001972 A1 | 1/2008 | |
| WO | 2012162102 A1 | 11/2012 | |

OTHER PUBLICATIONS

U.S. Appl. No. 13/941,361, filed Jul. 12, 2013, 50 pages.

U.S. Appl. No. 13/941,384, filed Jul. 12, 2013, 50 pages.

Young, G., "Management Update: The Future of Intrusion Prevention, Going Beyond Detection", Oct. 13, 2004, Gartner, Inc., Stamford, Connecticut, 14 pages.

"Cisco Adaptive Wireless Intrusion Prevention System", 2008, Cisco Systems Incorporated, San Jose, California, pp. 1-8.

Raja, S., "Network Intrusion Prevention Systems—Why 'Always on' Stateful Inspection and Deep Packet Analysis are Essential to Deliver Non-Stop Protection", Jan. 26, 2005, Top Layer Networks Inc., Hudson, Massachusetts, 12 pages.

Borisov, N., et al., "A Generic Application-Level Protocol Analyzer and its Language", Feb. 2005, Microsoft Research, Redmond, Washington, pp. 1-13.

Sekar, R., "A High-Performance Network Intrusion Detection System," in Proceedings of the 6th ACM conference on Computer and communications security,1999, Association for Computing Machinery, New York, New York, 10 pages.

Leidl, B., et al., "Snort TCP Stream Reassembly Integer Overflow Vulnerability", CORE-2003-0307, Apr. 15, 2003, Core Security Technologies, Boston, Massachusetts, 5 pages.

Juen, J., et al. "Basic Dynamic Analysis, Malware Analysis CS498sh", Fall 2012, University of Illinois at Urbana-Champaign, Urbana-Champaign, Illinois, 21 pages.

Rajaram, S., et al., "Client-Friendly Classification over Random Hyperplane Hashes", Machine Learning and Knowledge Discovery in Databases, 2008, vol. 5212, Springer-Verlag Berlin Heidelberg, Berlin, Germany, pp. 250-265.

Dai, S., et al., "MAPMon: A Host-Based Malware Detection Tool," 13th IEEE International Symposium on Pacific Rim Dependable Computing, Oct. 13, 2008, IEEE, Piscataway, New Jersey, pp. 349-356.

Mell, P., et al. "Guide to Malware Incident Prevention and Handling," NIST Special Publication 800-83, Nov. 2005, National Institute of Standards and Technology, Gaithersburg, Maryland, 101 pages.

(56) References Cited

OTHER PUBLICATIONS

Extended European Search Report for EP Application No. 14179336.4 from the European Patent Office dated Feb. 2, 2015, 5 pages.

International Search Report and Written Opinion for International Application No. PCT/US2014/041555, ISA/EPO, Date of Mailing Oct. 1, 2014, 9 pages.

EP Examination Report for European Application No. 14 179 336.4—1870, dated Jul. 25, 2016; 3 pgs.

* cited by examiner

SOFTWARE NETWORK BEHAVIOR ANALYSIS AND IDENTIFICATION SYSTEM

I. FIELD OF THE DISCLOSURE

The present disclosure is generally related to a system for software network behavior analysis and identification.

II. BACKGROUND

Information networks (e.g., corporate networks, non-corporate networks, private networks, and public networks) may facilitate movement and communication of data between individual devices and may contain assets that require protection from unauthorized accesses. Malicious software (e.g., malware or viruses) includes software components that may be used to disrupt computer operation, to gather sensitive information, to gain access to private computer systems, or for other undesirable purposes. Reverse engineering to determine effects of executing the malicious software may enable discovery of particular security vulnerabilities targeted by the malicious software and may enable detection of other malicious software.

Parties responsible for protecting digital assets may spend large amounts of time, money, effort, manpower, and other resources attempting to prevent new threats and stopping existing threats from becoming larger problems. Responding to threats may be slow and may require large amounts of human interaction. In addition, host-based detection systems may need to be updated to detect malicious software and to determine a potential scope of a threat. An analysis tool to analyze the malicious software may be limited to a particular operating environment. The particular operating environment may not be representative of a target operating environment of interest to an analyst. Moreover, collective evaluation of the malicious software by a team of analysts may be cumbersome and expensive.

III. SUMMARY

Systems and methods to detect and analyze network behavior of a software component are disclosed. The disclosed embodiments describe a system that may perform network-based detection of indicators that may correspond to a particular type of malicious software. Further, the indicators may be used to identify a software component as the particular type of malicious software. Additionally, the system may detect malicious software that is not yet identified as a "known" type or kind of malicious software.

In a particular embodiment, a method includes detecting, at a detection module, an indicator corresponding to a suspicious software component. The indicator is detected based on monitored network data of a network system and based on a plurality of network behavior profiles. At least one of the network behavior profiles includes an ordered sequence of network actions. The method further includes determining, at an identification module, whether the indicator corresponds to any of the plurality of network behavior profiles (e.g., the indicator may correspond to a particular network action or to an ordered sequence of network actions). The method further includes generating output data in response to a determination that the indicator corresponds to a particular network behavior profile of the plurality of network behavior profiles.

In another particular embodiment, a system includes a processor and a memory coupled to the processor. The memory stores instructions that, when executed by the processor, cause the processor to perform operations. The operations include detecting, at a detection module, an indicator corresponding to a suspicious software component. The indicator is detected based on monitored network data of a network system and based on a plurality of network behavior profiles. At least one of the network behavior profiles includes an ordered sequence of network actions. The operations further include determining, at an identification module, whether the indicator corresponds to any of the plurality of network behavior profiles (e.g., the indicator may correspond to a particular network action or to an ordered sequence of network actions). The operations further include generating output data in response to a determination that the indicator corresponds to a particular network behavior profile of the plurality of network behavior profiles.

In another particular embodiment, a computer-readable storage device stores instructions that, when executed by a processor, cause the processor to perform operations. The operations include detecting, at a detection module, an indicator corresponding to a suspicious software component. The indicator is detected based on monitored network data of a network system and based on a plurality of network behavior profiles. At least one of the network behavior profiles includes an ordered sequence of network actions. The operations further include determining, at an identification module, whether the indicator corresponds to any of the plurality of network behavior profiles (e.g., the indicator may correspond to a particular network action or to an ordered sequence of network actions). The operations further include generating output data in response to a determination that the indicator corresponds to a particular network behavior profile of the plurality of network behavior profiles.

One particular advantage provided by at least one of the disclosed embodiments is an ability to detect and analyze indicators associated with a software component based on network data and based on network behavior profiles, which may reduce a response time to a detected threat associated with the software component (without requiring access to host machines and without requiring that devices on a network support a specific configuration). Thus, a workload and a cost associated with protecting the network from malicious software may be reduced and security capabilities associated with the network may be improved.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
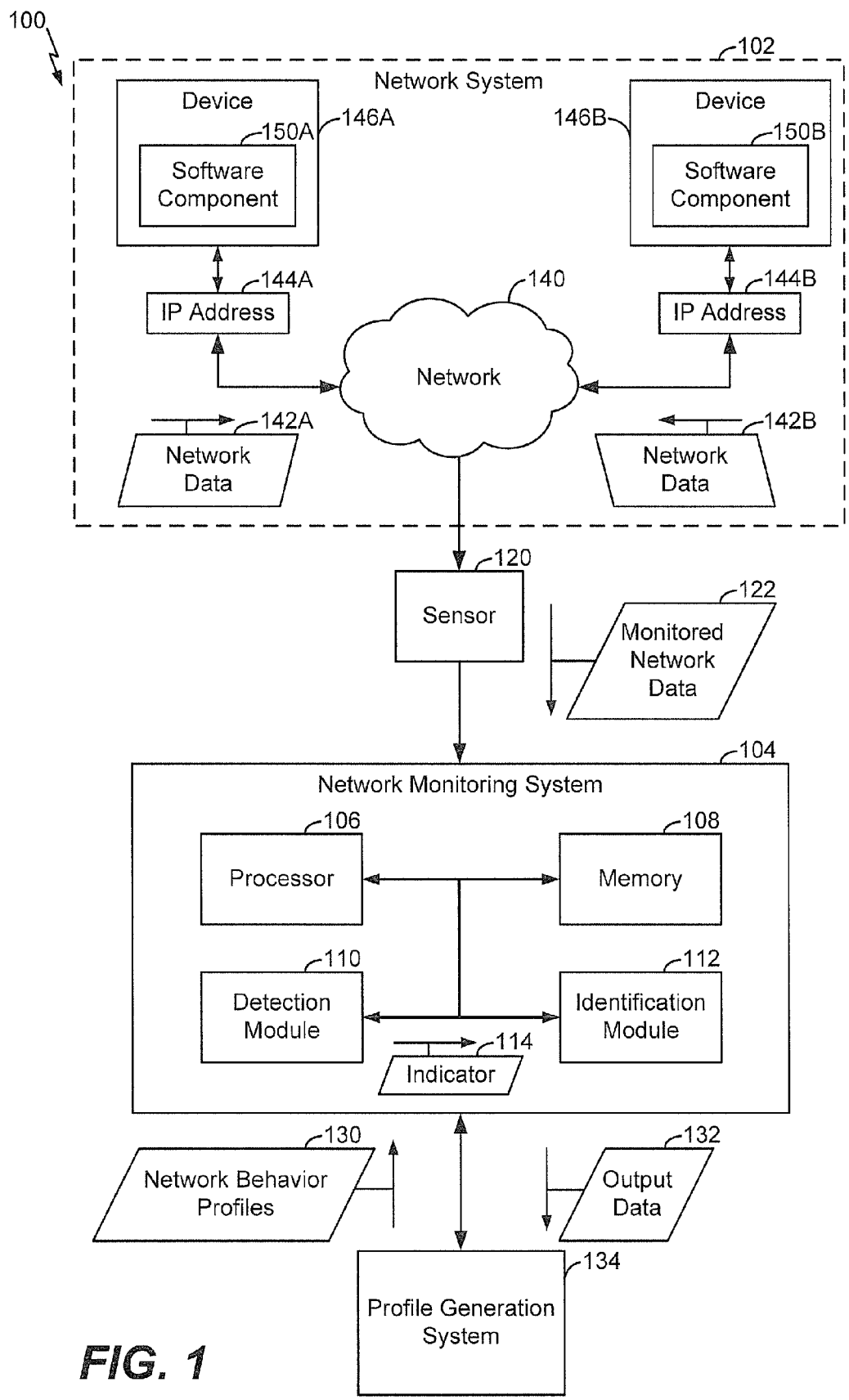
FIG. 1 is a block diagram of a particular embodiment of a system configured to detect network behavior associated with a software component.

Particular embodiments of the present disclosure are described below with reference to the drawings. In the description, common features are designated by common reference numbers throughout the drawings.

In a particular embodiment, a network monitoring system is configured to detect suspicious software components based on network activity resulting from actions of such software components. The network monitoring system is further configured to identify (e.g., categorize or match to a known software component) software components that are indicated (based on the network activity) to be suspicious. Network behavior profiles used to detect suspicious software components may be simpler (e.g., include fewer network actions) than profiles used to identify particular suspicious software components. A large volume of monitored network data may be processed to detect suspicious actions and a small subset of the monitored network data may be used for more comprehensive processing to identify particular suspicious software components.

In a particular embodiment, the network monitoring system is configured to receive monitored network data corresponding to network activity, such as port accesses, on a monitored network. The monitored network data may include information describing network actions that correspond to a particular software component that is active or has been active on a device that is coupled to the monitored network. For example, the monitored network data may include (or may be retrieved from) a log of transactions involving the network. The monitored network data may describe a single network action (e.g., an attempt to access a particular internet protocol (IP) address known to be suspicious) or multiple network actions (e.g., an ordered sequence of network actions such as a first network port access, followed by a particular secure shell (SSH) communication, followed by a second network port access).

The network monitoring system may also be configured to receive a plurality of network behavior profiles. Each network behavior profile may include information describing network actions that correspond to or indicate presence of a suspicious software component. For example, a network behavior profile associated with a particular suspicious software component may include data including a set of detection settings describing network behavior (e.g., an ordered sequence of network actions) associated with the particular suspicious software component. Using the detection settings associated with each of the network behavior profiles, the network monitoring system may select a subset of network actions (or detection settings) that may be used to identify a software component of a set of software components (e.g., known or previously identified suspicious software components) based on monitored network data.

The network monitoring system may be configured to analyze the monitored network data to detect network actions (e.g., indicators) that correspond to one or more detection settings from the network behavior profiles. When a network behavior profile includes more than one detection setting, results of comparing monitored network data to each of the detection settings may be aggregated (or weighted) and compared to a threshold. When the threshold is satisfied, the monitored network data or a portion of the monitored network data may be provided to an identification process to determine which specific software component is present based on the monitored network data and the software component identification information. Information describing the specific software component may be output to a user or to another software or hardware component of a system to facilitate removal or quarantine of the specific software component.

Referring to FIG. 1, a particular illustrative embodiment of a system 100 is shown. The system 100 includes a network system 102, a sensor 120, a network monitoring system 104, and a profile generation system 134. The network system 102 may include at least one device (e.g., a first device 146A and/or a second device 146B) coupled to a network 140. The at least one device may include a software component (e.g., a first software component 150A corresponding to the first device 146A and/or a second software component 150B corresponding to the second device 146B) and may be associated with a particular internet protocol (IP) address (e.g., a first IP address 144A corresponding to the first device 146A or a second IP address 144B corresponding to the second device 146B). The software component may include malware, spyware, virus software, trojan software, advanced persistent threat software, a software component targeted for removal, another form of malicious software, or a combination thereof. The network monitoring system 104 may include a processor 106, a computer-readable storage device (e.g., a memory 108), a detection module 110, and an identification module 112.

In a particular embodiment, the sensor 120 (e.g., a software or hardware network monitor) is configured to receive network data from the network system 102 and to provide monitored network data 122 (e.g., a log (or a portion of a log) of transactions involving the network 140) to the network monitoring system 104. The monitored network data 122 may be generated from network data (e.g., first network data 142A and/or second network data 142B) that is generated when the software component is active on a device (e.g., the first device 146A and/or the second device 146B) coupled to the network 140. The monitored network data 122 may include information regarding particular network actions, a timing of a particular network action, a timing since a most recent network action, a port access associated with the particular network action, an internet protocol address accessed during the particular network action, a duration of the particular network action, a communication protocol associated with the particular network action, an amount of bandwidth associated with the particular network action, other information regarding the network 140, devices coupled to the network 140, or software components active on the network 140, or a combination thereof. Such information may correspond to an indicator of a software component and may include information regarding one or more network actions associated with network data (e.g., first network data 142A and/or second network data 142B) of one or more devices (e.g., the first device 146A and/or the second device 146B) during a particular time period. For example, the first software component 150A may perform actions on the first device 146A that result in network actions, such as accessing ports of the network 140 in a particular order. The sensor 120 may detect the network actions and generate monitored network data 122 reporting the network actions.

In a particular embodiment, the network monitoring system 104 is configured to receive the monitored network data 122 from the sensor 120. The network monitoring system 104 may be configured to provide the monitored network data 122 and a plurality of network behavior profiles 130 to the detection module 110. The detection module 110, as further described with reference to FIGS. 2 and 3, may be configured to detect at least one indicator (e.g., an indicator 114) based on the monitored network data 122 and based on a plurality of network behavior profiles 130. Each network behavior profile of the plurality of network behavior profiles 130 may include one or more detection setting that may correspond to one or more network actions (e.g., an ordered sequence of network actions). For example, the plurality of network behavior profiles 130 may describe a plurality of detection settings, and the indicator 114 may be detected when the monitored network data 122 includes network actions that correspond to a particular detection setting (e.g., a first network port access, followed by a particular secure shell (SSH) communication, followed by a second network port access). Thus, a large volume of monitored network data may be processed to detect suspicious actions and a small subset of the monitored network data (e.g., data corresponding to the indicator 114) may be used for more comprehensive processing to identify particular suspicious software components. The detection module 110 may be further configured to provide the at least one indicator (e.g., the indicator 114) to the identification module 112. The processor 106 may include (or execute) the detection module 110 or the detection module 110 may be a separate component from the processor 106 (e.g., software executable by the processor 106 or by another processor).

The identification module 112, as further described with reference to FIGS. 2 and 4, may be further configured to receive the at least one indicator (e.g., the indicator 114) and a plurality of network behavior profiles 130, at least one of the network behavior profiles 130 including an ordered sequence of network actions (e.g., a sequence of network port accesses). The identification module 112 may determine whether a particular software component (e.g., the first software component 150A or the second software component 150B) corresponding to the at least one indicator corresponds to any of the plurality of network behavior profiles 130. For example, the identification module 112 may match the indicator 114 to a particular network behavior profile of the plurality of network behavior profiles 130. The identification module 112 may be further configured to generate output data 132 associated with the software component in response to a determination that the indicator 114 corresponds to a particular network behavior profile of the plurality of network behavior profiles 130. The processor 106 may include (or execute) the identification module 112 or the identification module 112 may be a separate component from the processor 106. The particular network behavior profile may include a plurality of detection settings (e.g., where a particular detection setting corresponds to the indicator), weighting information, or a combination thereof. When at least two indicators are received at the identification module 112, the identification module 112 may be further configured to generate output data 132 associated with the particular software component in response to a determination that the at least two indicators do not correspond to any network behavior profile of the plurality of network behavior profiles. For example, the identification module 112 may generate the output data 132 in response to determining that a first indicator and a second indicator together do not correspond to any of the plurality of network behavior profiles 130 (e.g., the first indicator was generated based on detection settings from a first network behavior profile and the second indicator was generated based on detection settings from a second network behavior profile). The output data 132 may be provided to the profile generation system 134. The profile generation system 134 may include software or hardware to implement a profile generation process as described further below.

In a particular embodiment, in response to a determination that the indicator 114 corresponds to the particular network behavior profile, a device (e.g., the first device 146A and/or the second device 146B) associated with a particular IP address (e.g., the first IP address 144A or the second IP address 144B) is prohibited from accessing the network 140. Alternatively, the device may be prevented from performing network accesses (e.g., particular port accesses) according to a behavior that corresponds to the indicator 114 or the particular software component that corresponds to the indicator 114 may be deleted from a computing device associated with the particular IP address.

In a particular embodiment, when the indicator 114 and another indicator together do not correspond to any network behavior profile of the plurality of network behavior profiles 130, the profile generation system 134 is configured to generate a new network behavior profile and to add the new network behavior profile to the plurality of network behavior profiles 130 based on the output data 132 associated with the indicator 114 and the other indicator. The profile generation system 134 may be further configured to modify existing network behavior profiles based on the output data 132. The plurality of network behavior profiles 130 may be stored in the memory 108 of the processing system, in the processor 106, or in another computer-readable storage device.

In a particular embodiment, the indicator 114 includes or represents a timed sequence of network actions and pauses, an ordered sequence of network actions, a sequence of network actions within a time period, a characteristic of a particular network action, or a combination thereof. The characteristic of the particular network action may include an internet protocol (IP) address (e.g., the first IP address 144A or the second IP address 144B) accessed during the particular network action, a duration of the particular network action, a communication protocol associated with the particular network action, an amount of bandwidth associated with the particular network action, or a combination thereof. The network actions may include port accesses. The port accesses may be associated with ports corresponding to devices (e.g., the first device 146A and/or the second device 146B) that include software components (e.g., the first software component 150A and/or the second software component 150B) that are associated with the indicator 114. Alternatively, the port accesses may be associated with ports corresponding to devices that do not include software components that are associated with the indicator 114.

In a particular embodiment, the plurality of network behavior profiles 130 are generated by the profile generation system 134 and correspond to a plurality of software components (e.g., the first software component 150A and/or the second software component 150B). The plurality of network behavior profiles 130 may include a plurality of detection settings associated with the plurality of software components and may be generated based on analysis of behavior associated with known software components. The plurality of network behavior profiles 130 may be stored in the memory 108, in the processor 106, or in another computer-readable storage device. A subset of the plurality of detection settings may be selected to generate a set of detectable detection settings. Each detection setting of the set of detectable detection settings is unique within the set of detectable detection settings. For example, the plurality of detection settings may be filtered to identify common or unique patterns of actions associated with recognized software components. Each detection setting of the set of detectable detection settings may be compared to the monitored network data 122 in parallel. At least one indicator (e.g., the indicator 114) may be detected when the monitored network data 122 includes characteristics that match a particular detection setting of the set of detectable detection settings defined by or corresponding to the network behavior profiles 130.

Thus, a particular network behavior profile may include a particular plurality of detection settings associated with a software component or type of software component that is "known" to pose a threat. The particular plurality of detection settings may be associated with a plurality of network behaviors associated with the particular software component or type of software component. The monitored network data 122 may be compared to the particular plurality of detection settings to detect indicators. In a particular embodiment, an indicator (e.g., of questionable/suspicious behavior, of behavior known to be malware-related, etc.) may correspond to a particular network action or set of actions, such as an ordered sequence of network actions. For example, the particular network action may include a network port access, a secure shell (SSH) communication, a domain name system (DNS) server query, an attempt to access a particular internet protocol (IP) port, an internet control message protocol (ICMP) request, a ping, an attempt to access a particular service, or a combination thereof. Alternatively, one or more other network actions may be used to define the first indicator. A second indicator may correspond to an ordered sequence of network actions. For example, an ordered sequence may include a first network port access, followed by a particular SSH communication, followed by a second network port access. As another example, the ordered sequence may include an attempt to access a particular IP address, followed by a particular DNS server query, followed by a particular internet control message protocol request. A third indicator may include a sequence of one or more periods of network activity and one or more pauses. For example, the third indicator may correspond to a first period of network activity having a first duration, followed by a pause having a second duration, followed by a second period of network activity having a third duration, etc. The order of the one or more periods of network activity and the one or more pauses, the durations, or a combination thereof, may correspond to the third indicator (e.g., the third indicator may correspond to a particular software component that performs actions that result in a particular IP address for fifteen seconds, followed by a pause of three seconds, followed by the particular software component performing actions that result in a particular DNS server query for eight seconds). A fourth indicator may correspond to an occurrence of one or more particular network actions during a particular time period. For example, the fourth indicator may correspond to a particular software component that performs actions causing a particular device to access a particular IP address, to perform a particular DNS server query, and to perform a particular internet control message protocol request within a particular time period. A fifth indicator may correspond to a usage of a particular amount of bandwidth for a particular amount of time. For example, the fifth indicator may correspond to a particular software component that performs actions causing a particular device to use 508 bits per second of bandwidth for 7 seconds. By recognizing such indicators and storing data regarding such indicators as network behavior profiles of the plurality of network behavior profiles 130, the system 100 may be able to identify suspicious/questionable network activity and identify the software component(s) causing such suspicious/questionable network activity without performing a packet-level analysis or a signature-level analysis of data associated with the suspicious/questionable network activity. For example, if a particular software component performs actions resulting in network actions corresponding to the third indicator, then the system 100 may generate data indicating that the particular software component is suspicious because of an association with the third indicator.

In a particular embodiment, a detection tree may be generated based on a plurality of network behavior profiles. The detection tree may indicate that a first detection setting of a plurality of detection settings depends on a second detection setting of the plurality of detection settings. The second detection setting may be compared to the monitored network data 122 to detect a second indicator. The first detection setting may be compared to the monitored network data 122 to detect a first indicator in response to a determination that the monitored network data 122 includes the second indicator. Thus, the detection tree may allow the network monitoring system 104 to match monitored network data 122 to fewer detection settings to determine that a particular software component does not match a particular network behavior profile (e.g., if the second detection setting is not matched, then there is no need to compare the monitored network data to the first detection setting).

Figure 2:
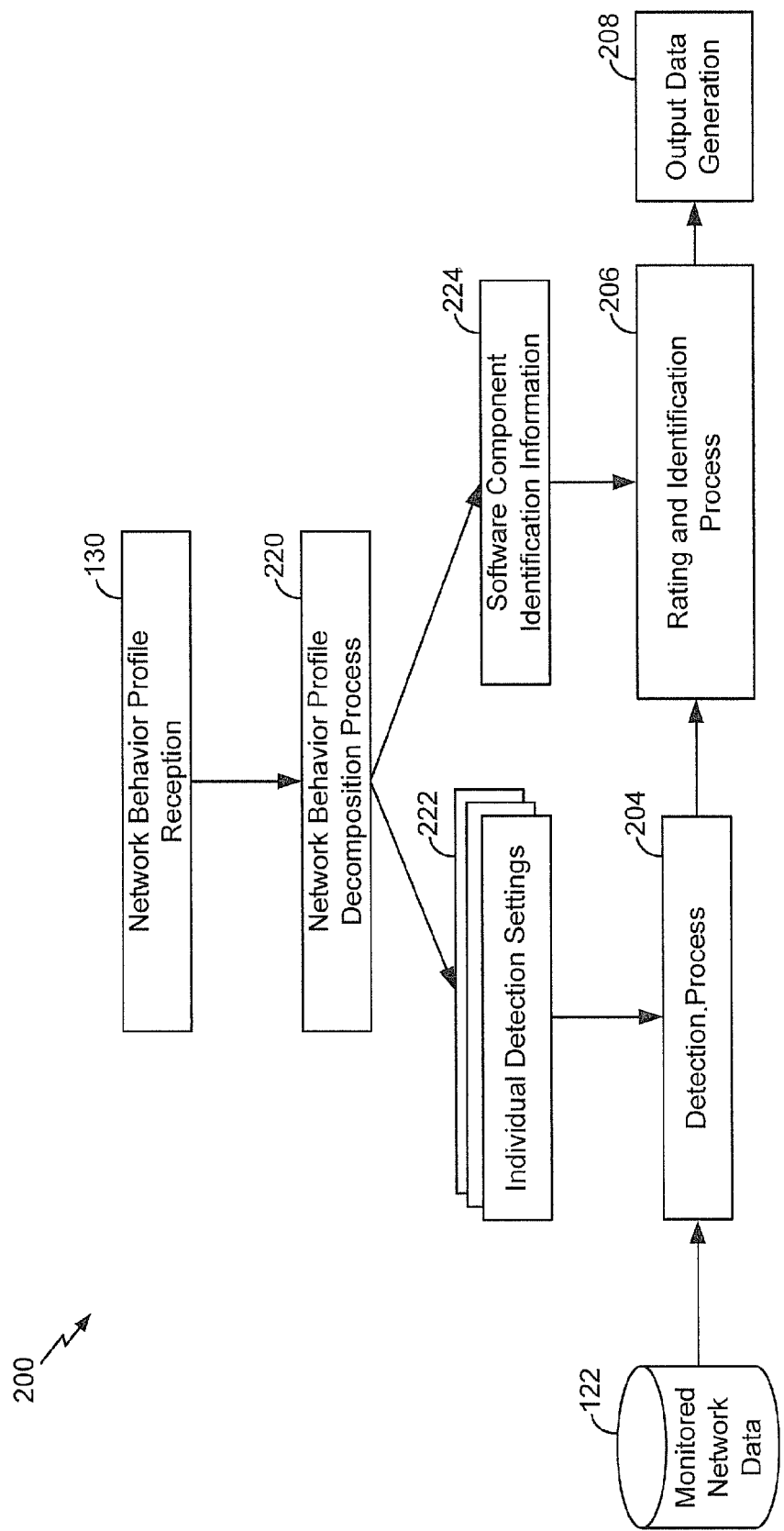
FIG. 2 is a diagram illustrating a software network behavior detection process that may be performed by the system of FIG. 1.

FIG. 2 illustrates a particular embodiment of a process 200 that may be performed by the network monitoring system 104 of FIG. 1. The process 200 includes receiving a plurality of network behavior profiles 130. The plurality of network behavior profiles 130 may be decomposed, at 220, into individual detection settings 222 and into software component identification information 224. The monitored network data 122 and the individual detection settings 222 are provided to a detection process 204, as further described with reference to FIG. 3. For example, the detection process 204 may be performed at the detection module 110 of FIG. 1. Outputs from the detection process 204 and the software component identification information 224 are provided to a rating and identification process 206. For example, the rating and identification process 206 may be performed at the identification module 112 of FIG. 1. The rating and identification process 206 may be configured to provide output to an output data generation unit 208, as further described with reference to FIG. 4. Data output by the output data generation unit 208 may correspond to the output data 132 of FIG. 1 and may identify the monitored network data 122 as corresponding to a known software component or type of software component or as corresponding to an unknown software component. The output data 132 may identify the monitored network data 122 as corresponding to a suspicious software component. In a particular embodiment, instructions corresponding to the process 200 are stored in the memory 108 of FIG. 1 and are executed by the processor 106 of FIG. 1. Thus, when the network monitoring system 104 of FIG. 1 performs the process 200, the network monitoring system 104 may detect and analyze indicators associated with a software component based on the monitored network data 122 and the network behavior profiles 130 to detect a threat associated with the software component.

Figure 3:
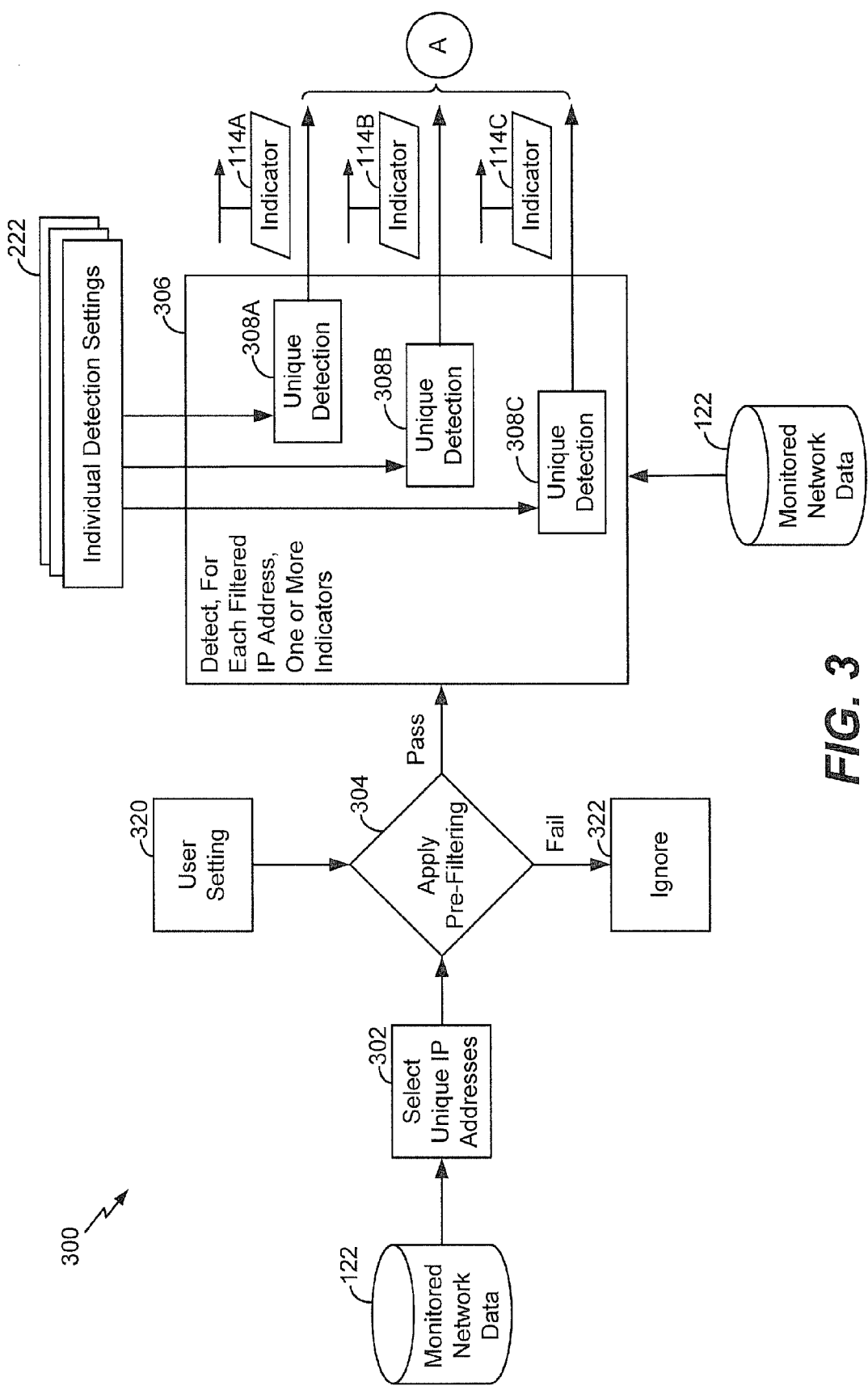
FIG. 3 is a diagram illustrating a first portion of a particular embodiment of a method of performing a software network behavior detection and identification process.

FIG. 3 illustrates a process 300 that includes a first portion of a particular embodiment of a method of performing a software network behavior detection and identification process. The process 300 includes receiving the monitored network data 122 (e.g., receiving a log of transactions involving a network) and, at 302, selecting unique Internet protocol (IP) addresses from the monitored network data 122. For example, a log of transactions involving the network 140 of FIG. 1 may be received, and a particular IP address may be selected from the log. The unique IP addresses may correspond to IP addresses (e.g., the first IP address 144A and/or the second IP address 144B of FIG. 1) that correspond to a set of particular distinct devices (e.g., the first device 146A and/or the second device 146B of FIG. 1). In a particular embodiment, the monitored network data 122 identifies a plurality of IP addresses.

The process 300 further includes, at 304, applying pre-filtering based on the unique IP addresses and a user setting 320. A portion of the monitored network data 122 that does not satisfy the pre-filter(s) may be ignored, at 322, and another portion of the monitored network data 122 that satisfies the pre-filter(s) may be used to detect one or more indicators (e.g., a first indicator 114A, a second indicator 114B, and/or a third indicator 114C), at 306. For example, the log of transactions may be filtered such that network actions corresponding to the particular IP address may be used to detect indicators and network actions corresponding to other IP addresses of the log are ignored. The pre-filtering may include selecting monitored network data 122 corresponding to particular unique IP addresses and choosing to ignore the selected monitored network data 122 based on the user setting 320 because, for example, the user settings 320 may indicate that a particular device frequently produces suspicious-looking network behavior even though malicious software is not present on the particular device. Thus, the user may change a user setting 320 so that the process 300 will ignore monitored network data 122 corresponding to a unique IP address that corresponds to the particular device. Thus, the portion of the monitored network data 122 that is used at 306 may correspond to a filtered subset of the plurality of IP addresses.

The process 300 may include, at 306, comparing characteristics of the monitored network data 122 to the individual detection settings 222 to determine one or more unique detections (e.g., a first unique detection 308A, a second unique detection 308B, and/or a third unique detection 308C). For example, a particular individual detection setting may include or correspond to an access to a particular IP address. A particular unique detection may be determined when the monitored network data 122 includes or corresponds to an access to the particular IP address. The one or more unique detections may be used to generate the one or more indicators. In the example, the particular unique detection may be used to generate a particular indicator. As described with reference to FIG. 1, the one or more indicators are sent from the detection module 110 (e.g., a module that may be used to perform the process 300) to an identification module 112 (e.g., a module that may be used to perform the process 400 of FIG. 4, as described below). The one or more indicators detected from the monitored network data 122 correspond to IP addresses of the filtered subset of the plurality of IP addresses. Thus, the process 300 may be used to detect indicators from monitored network data so that the indicators may be used to identify potentially suspicious software components that perform actions that result in network activity that creates the monitored network data.

Figure 4:
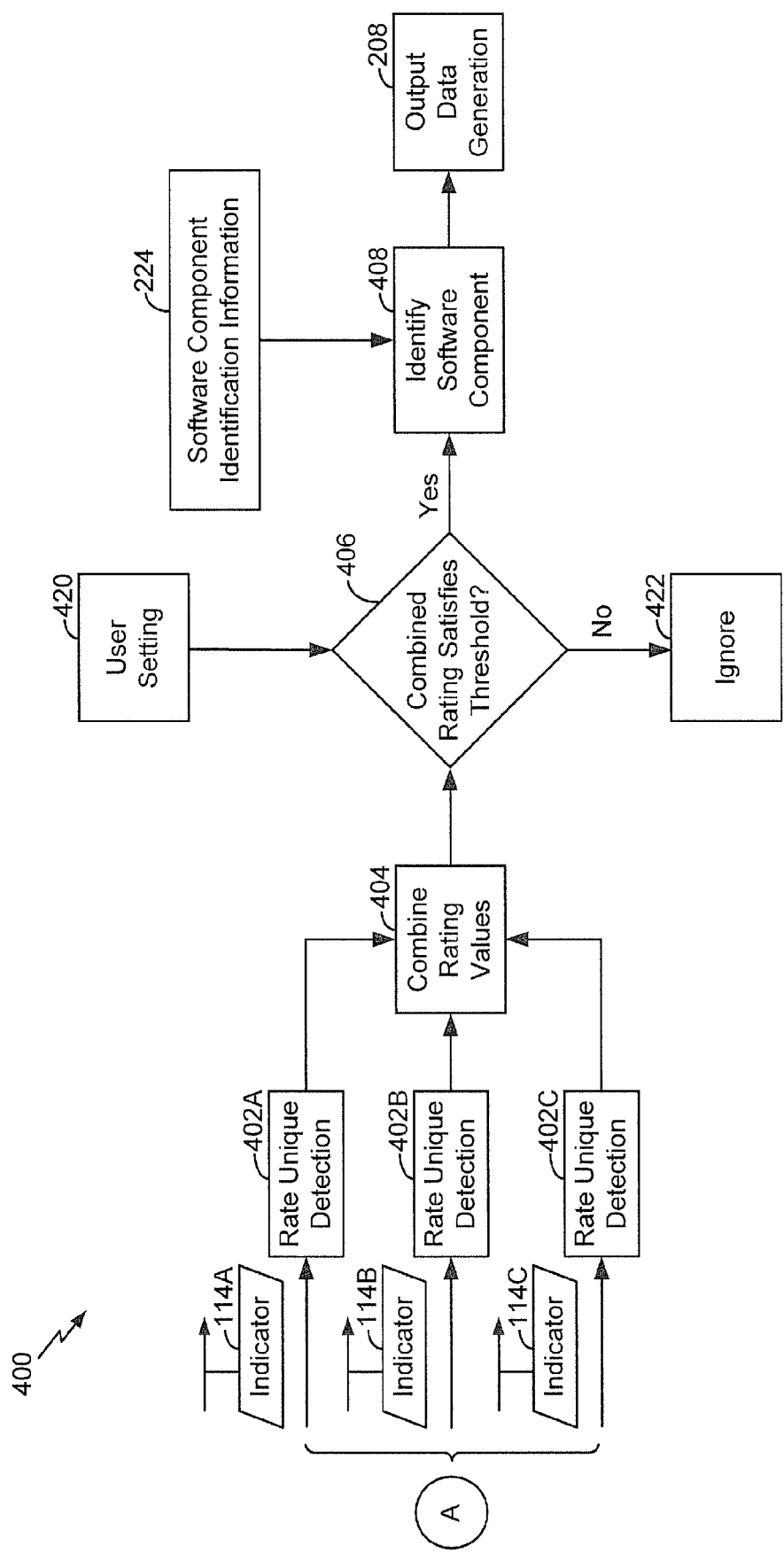
FIG. 4 is a diagram illustrating a second portion of the particular embodiment of the method of performing the software network behavior detection and identification process.

FIG. 4 illustrates a process 400 that includes a second portion of a particular embodiment of a method of performing software network behavior detection and identification.

The process includes rating a unique detection corresponding to each indicator (e.g., creating a first unique detection rating 402A corresponding to the first indicator 114A, creating a second unique detection rating 402B corresponding to the second indicator 114B, and/or creating a third unique detection rating 402C corresponding to the third indicator 114C). The indicators may be received from the process 300 of FIG. 3. The unique detection ratings may be generated based on information from a particular network behavior profile of the plurality of network behavior profiles 130 of FIG. 1. The unique detection rating of a particular indicator may be different or the same for each of the plurality of network behavior profiles. The unique detection ratings may be combined to create an identification rating, at 404, and compared to a threshold (e.g., a value used to indicate a minimum confidence used to determine a match between a particular network behavior profile and indicators associated with a particular software component), at 406. The threshold may be defined by a user setting 420 and may be used to determine whether a particular combination of indicators corresponds to a particular network behavior profile (e.g., of the plurality of network behavior profiles 130 of FIG. 1).

For example, the first indicator 114A may correspond to a first unique detection rating 402A (of 5), the second indicator 114B may correspond to a second unique detection rating 402B (of 4), and the third indicator 114C may correspond to a third unique detection rating 402C (of 2). In the example, the first unique detection rating 402A, the second unique detection rating 402B, and the third unique detection rating 402C may be combined to create an identification rating (of 11). The identification rating may be compared to a threshold (e.g., 10 or 12) to determine whether the threshold is met. The threshold may be met even though a particular indicator is not identified by the particular network behavior profile (e.g., a unique detection rating associated with the particular indicator is 0).

When the combined unique detection rating value does not satisfy the threshold, the indicators (e.g., indicators corresponding to a particular IP address) may be ignored, at 422. When the combined unique detection rating value satisfies the threshold, the indicators (e.g., the first indicator 114A, the second indicator 114B, and/or the third indicator 114C) may be used with the software component identification information 224 (e.g., identification information corresponding to a particular network behavior profile) to identify, at 408, the software component corresponding to the indicators.

In a particular embodiment, the software component is identified corresponding to a particular network behavior profile. In the particular embodiment, because the software component corresponds to the particular network behavior profile, the software component is identified as including malware, spyware, virus software, trojan software, advanced persistent threat software, a particular software component targeted for removal, another form of malicious software, or a combination thereof. In another particular embodiment, the indicators do not correspond to a "known" network behavior profile that was used to generate the software component identification information 224 (e.g., each identification rating corresponding to the indicators does not meet a corresponding threshold associated with each network behavior profile of the plurality of network behavior profiles 130 of FIG. 1 because the indicators correspond to different network behavior profiles). Output data (e.g., the output data 132 of FIG. 1) may be generated, at 208, identifying the software component as corresponding to a particular network behavior profile or as not corresponding to any "known" network behavior profile identified by a network monitoring system (e.g., the network monitoring system 104 of FIG. 1). When the output data indicates that the software component does not correspond to any "known" network behavior profile identified by a network monitoring system, a new network behavior profile corresponding to a network behavior of the software component may be created (e.g., at the profile generation system 134 of FIG. 1) for subsequent use (e.g., stored as one of the plurality of network behavior profiles 130 and used to identify suspicious software components).

When an identification rating associated with the indicators (e.g., the indicators 114A-C) satisfies thresholds corresponding to more than one network behavior profile, a software component associated with the indicators is identified based on a greatest identification rating. In a particular embodiment, a first identification rating (e.g., the first unique detection rating 402A) is generated based on a first correspondence between the first indicator 114A and a first network behavior profile. A second identification rating may be generated based on a second correspondence between the first indicator 114A and a second network behavior profile. A suspicious software component (e.g., the first software component 150A of FIG. 1) associated with the first indicator 114A may be determined to correspond to the first network behavior profile based on a determination that the first identification rating is greater than a greatest identification rating (e.g., the second identification rating) associated with all other network behavior profiles of the plurality of network behavior profiles, and that the first identification rating satisfies a threshold. The suspicious software component may be determined not to correspond to the first network behavior profile based on a determination that the first identification rating does not satisfy the threshold.

Figure 5:
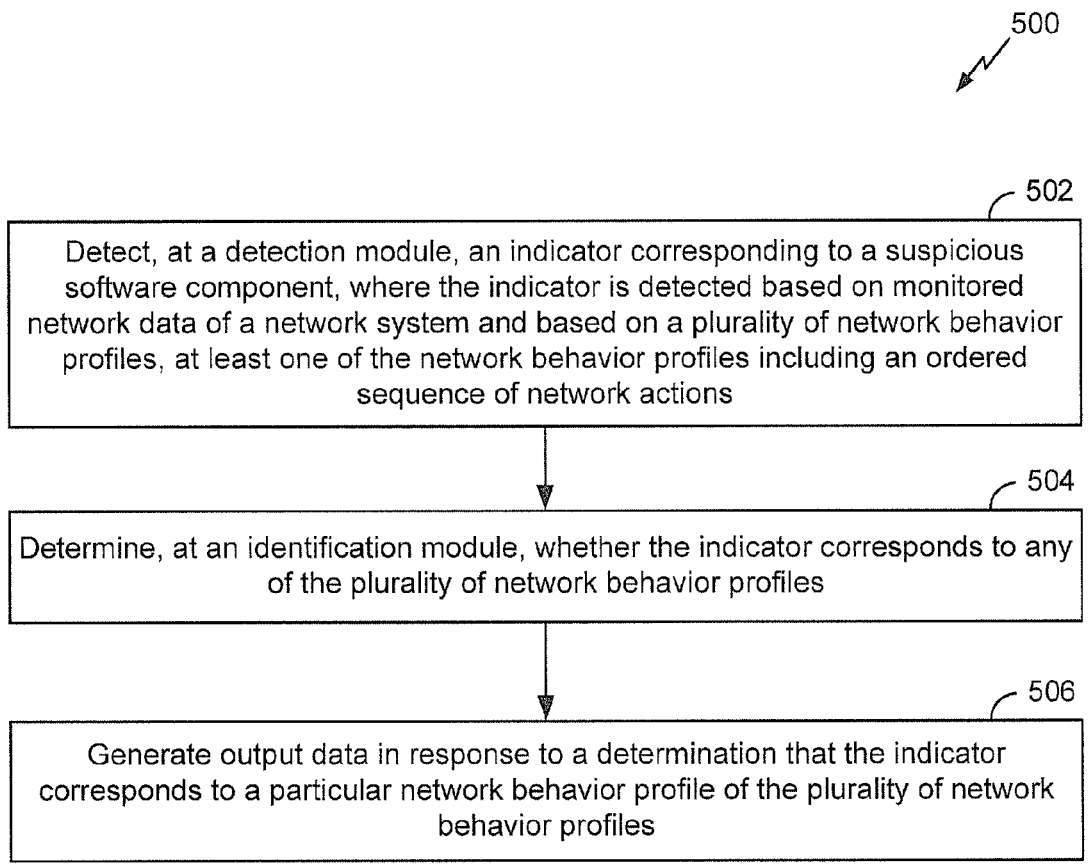
FIG. 5 is a flow chart illustrating a particular embodiment of a method of analyzing and identifying software based on network behavior.

FIG. 5 is a flowchart illustrating a particular embodiment of a method 500 of analyzing and identifying a software component based on network behavior. The method 500 includes, at 502, detecting, at a detection module, an indicator corresponding to a suspicious software component, where the indicator is detected based on monitored network data of a network system and based on a plurality of network behavior profiles, where at least one of the network behavior profiles includes an ordered sequence of network actions. For example, as described with reference to FIG. 1, the detection module 110 may be used to detect the indicator 114 corresponding to the first software component 150A based on the monitored network data 122 of the network system 102 and based on the plurality of network behavior profiles 130. At least one of the plurality of network behavior profiles 130 may include an ordered sequence of network actions (e.g., a first network port access, followed by a particular secure shell (SSH) communication, followed by a second network port access).

The method 500 further includes, at 504, determining, at an identification module, whether the indicator corresponds to any of the plurality of network behavior profiles. For example, the identification module 112 may be used to determine whether the indicator 114 corresponds to at least one of the plurality of network behavior profiles 130.

The method further includes, at 506, generating output data in response to a determination that the indicator corresponds to a particular network behavior profile of the plurality of network behavior profiles. For example, the network monitoring system 104 may be used to generate the output data 132 associated with the first software component 150A in response to determining that the indicator 114 corresponds to a particular network behavior profile of the plurality of network behavior profiles 130.

The method of FIG. 5 may be initiated, controlled, or performed by a processing unit such as a central processing unit (CPU), an application-specific integrated circuit (ASIC), a controller, another hardware device, firmware device, or any combination thereof. As an example, the method of FIG. 5 can be initiated, controlled, or performed by a processor that executes instructions stored at a memory (e.g., a computer-readable storage device such as the memory 108 of FIG. 1).

Figure 6:
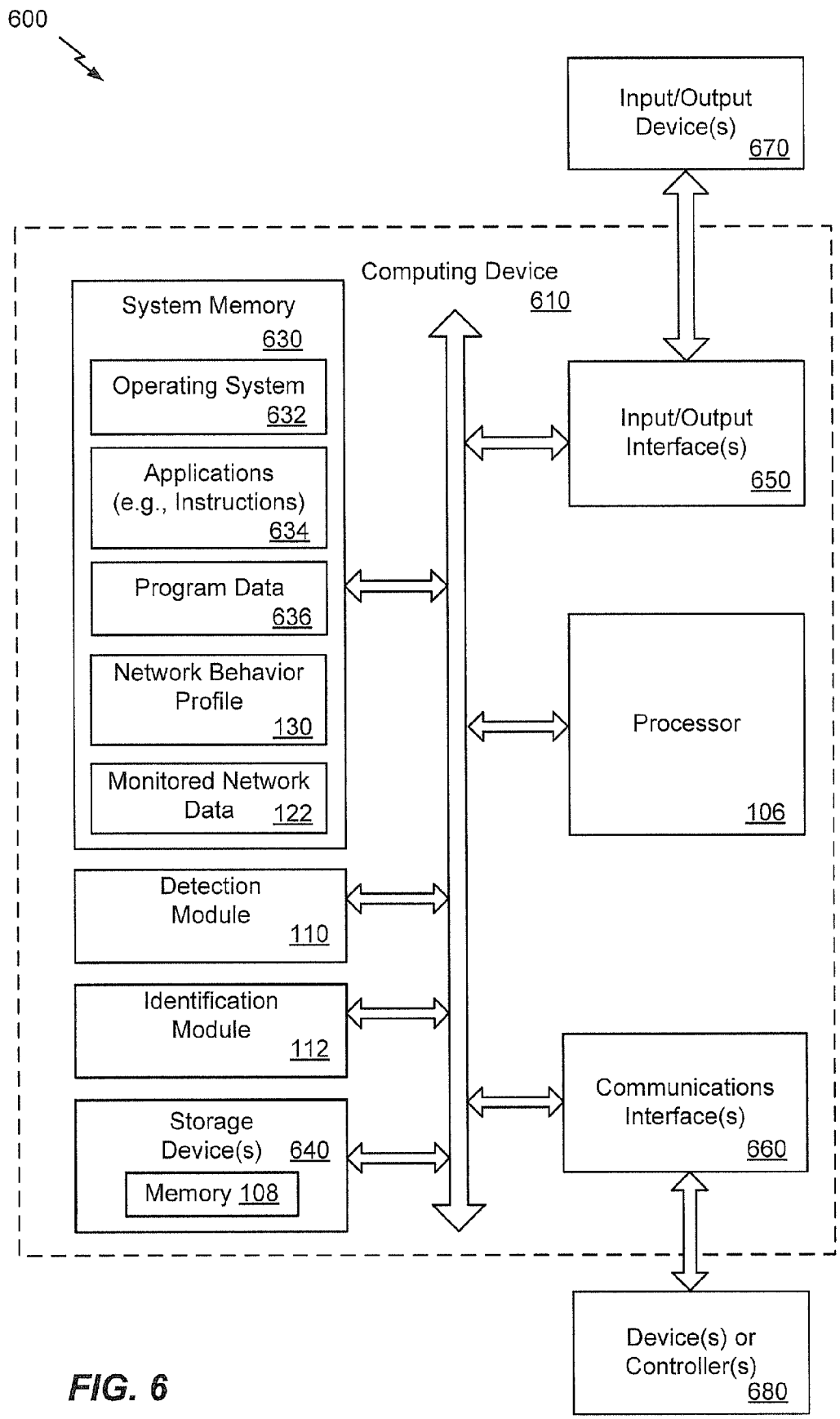
FIG. 6 is a block diagram of a particular illustrative embodiment of a computing environment configured to analyze and identify software based on network behavior.

FIG. 6 is a block diagram of a computing environment 600 including a computing device 610 configured to support embodiments of computer-implemented methods and computer-executable program instructions (or code) according to the present disclosure. For example, the computing device 610, or portions thereof, may execute instructions to analyze network actions associated with actions of a software component. In a particular embodiment, the computing device 610 may include, may be included within, or may correspond to the system 100 of FIG. 1.

The computing device 610 may include the processor 106 of FIG. 1. The processor 106 may communicate with a memory (e.g., the system memory 630), a detection module (e.g., the detection module 110 of FIG. 1), an identification module (e.g., the identification module 112 of FIG. 1), one or more storage devices (e.g., one or more storage devices 640), one or more input/output interfaces (e.g., one or more input/output interfaces 650), one or more communications interfaces (e.g., one or more communications interfaces 660), or a combination thereof. In a particular embodiment, the processor 106 includes the detection module 110 and the identification module 112.

The system memory 630 may include volatile memory devices (e.g., random access memory (RAM) devices), nonvolatile memory devices (e.g., read-only memory (ROM) devices, programmable read-only memory, and flash memory), or both. The system memory 630 may include an operating system 632, which may include a basic/input output system for booting the computing device 610 as well as an operating system to enable the computing device 610 to interact with users, other programs, and other devices. The system memory 630 may include one or more applications 634 that may be executable by the processor 106, such as a software component analysis application (e.g., an application that is executable to analyze network behavior associated with a software component and identify the software component). The system memory 630 may include program data 636. The system memory 630 may include the plurality of network behavior profiles 130 and the monitored network data 122 of FIG. 1. The plurality of network behavior profiles 130 and the monitored network data 122 may be used by the processor 106 to automatically analyze the monitored network data 122 to detect one or more indicators (e.g., the indicator 114) and to identify a software component based on the one or more indicators.

The processor 106 may also communicate with one or more storage devices 640. For example, the one or more storage devices 640 may include nonvolatile storage devices, such as magnetic disks, optical disks, or flash memory devices. The storage devices 640 may include both removable and non-removable memory devices. The storage devices 640 may be configured to store an operating system, images of operating systems, applications, and program data. In a particular embodiment, the storage devices 640 may include the memory 108 of FIG. 1. In a particular embodiment, the memory 108, the storage devices 640, or both, include tangible, non-transitory computer-readable media.

The processor 106 may also communicate with one or more input/output interfaces 650 that enable the computing device 610 to communicate with one or more input/output devices 670 to facilitate user interaction. The input/output interfaces 650 may include serial interfaces (e.g., universal serial bus (USB) interfaces or Institute of Electrical and Electronics Engineers (IEEE) 1394 interfaces), parallel interfaces, display adapters, audio adapters, and other interfaces. The input/output devices 670 may include keyboards, pointing devices, displays, speakers, microphones, touch screens, and other devices. The processor 106 may detect interaction events based on user input received via the input/output interfaces 650. Additionally, the processor 106 may send a display to a display device via the input/output interfaces 650.

The processor 106 may communicate with devices or controllers 680 via the one or more communications interfaces 660. The one or more communications interfaces 660 may include wired Ethernet interfaces, IEEE 802 wireless interfaces, or other network interfaces. The devices or controllers 680 may include host computers, servers, workstations, and other computing devices. For example, the devices or controllers 680 may include the first device 146A and/or the second device 146B of FIG. 1.

Thus, in particular embodiments, a computer system may analyze network data associated with a software component. For example, the applications 634 may be executable by the processor 106 to analyze network behavior associated with a software component and identify the software component as potentially suspicious.

Embodiments described above are illustrative and do not limit the disclosure. Numerous modifications and variations are possible in accordance with the principles of the present disclosure.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the figures or one or more method steps may be omitted. Accordingly, the disclosure and the figures are to be regarded as illustrative rather than restrictive.

Moreover, although specific embodiments have been illustrated and described herein, it is to be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, the claimed subject matter may be directed to fewer than all of the features of any of the disclosed embodiments.

What is claimed is:

1. A method comprising:

detecting, at a detection module, an indicator corresponding to a suspicious software component, wherein the indicator is detected based on monitored network data of a network system and based on a plurality of network behavior profiles, wherein the plurality of network behavior profiles correspond to a plurality of suspicious software components, and wherein a first network behavior profile of the plurality of network behavior profiles includes a first ordered sequence of network actions associated with a first suspicious software component of the plurality of suspicious software components;

combining a first rating associated with the indicator and a second rating associated with a second indicator to generate a total rating for a particular internet protocol address associated with a device that corresponds to the monitored network data;

after determining to provide the indicator to an identification module based on a comparison of the total rating with a threshold value, determining, at the identification module, whether the indicator corresponds to any of the plurality of network behavior profiles; and generating output data in response to a determination that the indicator corresponds to a particular network behavior profile of the plurality of network behavior profiles.

2. The method of claim 1, wherein a second network behavior profile of the plurality of network behavior profiles includes a second ordered sequence of network actions associated with a second suspicious software component of the plurality of suspicious software components, wherein the second ordered sequence of network actions is distinct from the first ordered sequence of network actions, and wherein the second suspicious software component is distinct from the first suspicious software component.

3. The method of claim 1, wherein the output data indicates the particular network behavior profile corresponding to the indicator, and wherein the threshold value indicates whether the total rating corresponds to a particular network behavior profile of the plurality of network behavior profiles.

4. The method of claim 1, wherein the indicator corresponds to at least one of a timed sequence of network actions and pauses, an ordered sequence of network actions, a sequence of network actions within a time period, or a characteristic of a particular network action.

5. The method of claim 4, wherein the characteristic includes at least one of an internet protocol address accessed during the particular network action, a duration of the particular network action, a communication protocol associated with the particular network action, or an amount of bandwidth associated with the particular network action.

6. The method of claim 1, wherein the first ordered sequence of network actions includes at least one of a network port access, a secure shell communication, a domain name system server query, an attempt to access a particular internet protocol port, an internet control message protocol request, a ping, or an attempt to access a particular service.

7. The method of claim 1, wherein the first ordered sequence of network actions comprises a first network port access, a particular secure shell communication after the first network port access, and a second network port access after the particular secure shell communication.

8. The method of claim 1, further comprising:
   detecting, at the detection module, the second indicator corresponding to the suspicious software component, wherein the second indicator is detected based on the monitored network data of the network system and based on the plurality of network behavior profiles;
   determining, at the identification module, whether the second indicator corresponds to any of the plurality of network behavior profiles; and
   generating second output data in response to a determination that the indicator and the second indicator together do not correspond to any network behavior profile of the plurality of network behavior profiles.

9. The method of claim 8, further comprising sending the second output data to a computing system.

10. The method of claim 1, further comprising, prior to combining the first rating and the second rating:
    generating the first rating based on information derived from the first network behavior profile; and
    generating the second rating based on information derived from a second network behavior profile.

11. The method of claim 1, further comprising:
    comparing the total rating to the threshold value; and
    determining whether the indicator corresponds to at least one network behavior profile in response to a determination that the total rating satisfies the threshold value.

12. The method of claim 1, further comprising:
    prior to detecting the indicator and the second indicator, filtering the monitored network data to generate a portion of the monitored network data;
    detecting the indicator and the second indicator in the portion of the monitored network data;
    generating the first rating and the second rating based on information derived from the first network behavior profile and a second network behavior profile;
    receiving the threshold value, the threshold value indicative of a correspondence between the total rating and the particular network behavior profile; and
    comparing the total rating and the threshold value.

13. A system comprising:
    a processor; and
    a memory coupled to the processor, the memory storing instructions that, when executed by the processor, cause the processor to perform operations comprising:
    detecting an indicator corresponding to a suspicious software component, wherein the indicator is detected based on monitored network data of a network system and based on a plurality of network behavior profiles, wherein the plurality of network behavior profiles correspond to a plurality of suspicious software components, and wherein a first network behavior profile of the plurality of network behavior profiles includes a first ordered sequence of network actions associated with a first suspicious software component of the plurality of suspicious software components;
    combining a first rating associated with the indicator and a second rating associated with a second indicator to generate a total rating for a particular internet protocol address associated with a device that corresponds to the monitored network data;
    after determining that the total rating satisfies a threshold value, determining whether the indicator corresponds to any of the plurality of network behavior profiles; and
    generating output data in response to a determination that the indicator corresponds to a particular network behavior profile of the plurality of network behavior profiles.

14. The system of claim 13, wherein the operations further include:
    receiving the plurality of network behavior profiles, wherein the plurality of network behavior profiles includes a plurality of detection settings associated with a plurality of software components;
    storing the plurality of network behavior profiles; and
    selecting a subset of the plurality of detection settings to generate a set of detectable detection settings, wherein each detection setting of the set of detectable detection settings is unique within the set of detectable detection settings.

15. The system of claim 14, wherein the operations further include:
    comparing each detection setting of the set of detectable detection settings to the monitored network data in parallel; and
    detecting the indicator when the monitored network data includes characteristics that match a particular detection setting of the set of detectable detection settings.

16. The system of claim 13, wherein the operations further include:
    generating the first rating based on a first correspondence between the indicator and the first network behavior profile of the plurality of network behavior profiles;
    generating the second rating based on a second correspondence between the indicator and a second network behavior profile of the plurality of network behavior profiles;
    wherein the suspicious software component is determined to correspond to the first network behavior profile based on a determination that the first rating is greater than a greatest identification rating associated with other network behavior profiles of the plurality of network behavior profiles and that the first rating satisfies an identification threshold; and
    wherein the suspicious software component is determined to not correspond to the first network behavior profile based on a determination that the first identification rating does not satisfy the identification threshold.

17. The system of claim 13, wherein the operations further include:
    generating a detection tree based on the plurality of network behavior profiles, wherein the detection tree indicates that a first detection setting of a plurality of detection settings depends on a second detection setting of the plurality of detection settings;
    comparing the second detection setting to the monitored network data to detect the second indicator; and
    comparing the first detection setting to the monitored network data to detect a first indicator in response to a determination that the monitored network data includes the second indicator.

18. A computer-readable storage device storing instructions that, when executed by a processor, cause the processor to perform operations comprising:

detecting an indicator corresponding to a suspicious software component based on monitored network data of a network system and based on a plurality of network behavior profiles, wherein the plurality of network behavior profiles correspond to a plurality of suspicious software components, and wherein a first network behavior profile of the plurality of network behavior profiles includes a first ordered sequence of network actions associated with a first suspicious software component of the plurality of suspicious software components;

combining a first rating associated with the indicator and a second rating associated with a second indicator to generate a total rating for a particular internet protocol address associated with a device that corresponds to the monitored network data;

determining whether the indicator corresponds to any of the plurality of network behavior profiles in response to the total rating meeting a threshold value; and generating first output data in response to a determination that the indicator correspond to a particular network behavior profile of the plurality of network behavior profiles.

19. The computer-readable storage device of claim 18, wherein the operations further include:

receiving information identifying a plurality of internet protocol addresses at the processor;

generating a filtered subset of the plurality of internet protocol addresses; and detecting that the indicator corresponds to at least one internet protocol address of the filtered subset of the plurality of internet protocol addresses.

20. The computer-readable storage device of claim 18, wherein the operations further include, in response to the determination that the indicator corresponds to the particular network behavior profile, prohibiting a device associated with the particular internet protocol address from accessing a network of the network system, wherein the indicator corresponds to the particular internet protocol address.

* * * * *